(12) United States Patent
Erad et al.

(10) Patent No.: US 10,884,093 B2
(45) Date of Patent: *Jan. 5, 2021

(54) SYSTEM AND METHOD FOR DETERMINING THE RELATIVE DIRECTION OF AN RF TRANSMITTER

(71) Applicant: Hisep Technology Ltd., Yavne (IL)

(72) Inventors: Yariv Erad, Kidron (IL); Gad Vered, Beer Yaacov (IL); Menachem Erad, Ashdod (IL); Uri Vered, Rishon Lezion (IL)

(73) Assignee: HISEP TECHNOLOGY LTD., Yavne (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/883,418

(22) Filed: May 26, 2020

(65) Prior Publication Data

US 2020/0355778 A1 Nov. 12, 2020

Related U.S. Application Data

(63) Continuation of application No. 16/045,306, filed on Jul. 25, 2018, now Pat. No. 10,705,175, which is a continuation of application No. PCT/IL2017/050001, filed on Jan. 1, 2017.

(60) Provisional application No. 62/286,987, filed on Jan. 26, 2016.

(51) Int. Cl.
*G01S 3/28* (2006.01)
*G01S 3/04* (2006.01)
*G01S 5/02* (2010.01)

(52) U.S. Cl.
CPC ........... *G01S 3/28* (2013.01); *G01S 3/043* (2013.01); *G01S 5/02* (2013.01)

(58) Field of Classification Search
CPC ........... G01S 3/28; G01S 3/043; G01S 5/02
See application file for complete search history.

(56) References Cited

U.S. PATENT DOCUMENTS

2011/0208036 A1* 8/2011 Axelrod ............. C12Q 1/54
600/407
2016/0174842 A1* 6/2016 Hyde ............... A61B 5/6867
342/52

* cited by examiner

*Primary Examiner* — Marc Anthony Armand
(74) *Attorney, Agent, or Firm* — The Roy Gross Law Firm, LLC; Roy Gross

(57) ABSTRACT

The subject matter discloses a method to determine a relative direction of a target RF transmitter, performed by a direction finding (DF) system comprising at least a pair of antennas having an electromagnetic-absorbing material between them, comprising conducting wireless communication between the target RF transmitter and each one of the antennas of the DF system, measuring the signal strength of the target RF transmitter received at each antenna, calculating the difference between the signal strength measured at each one of the antennas in the pair, and determining a relative direction of the target RF transmitter to be is the direction of the antenna within the pair of antennas in which the stronger signal was measured.

23 Claims, 19 Drawing Sheets

SYSTEM AND METHOD FOR DETERMINING THE RELATIVE DIRECTION OF AN RF TRANSMITTER

CROSS REFERENCE TO RELATED APPLICATIONS

This application is a Continuation of U.S. application Ser. No. 16/045,306 filed on Jul. 25, 2018 (now issued as U.S. Pat. No. 10,705,175), which is a Continuation of PCT Patent Application No. PCT/IL2017/050001 having International filing date of Jan. 1, 2017, which claims the benefit of priority of U.S. Provisional Application No. 62/286,987 filed on Jan. 26, 2016. The contents of the above applications are all incorporated by reference as if fully set forth herein in their entirety.

FIELD OF THE INVENTION

The present invention relates to the use of wave absorbing material in general, and the use of electromagnetic-absorbing material in particular to create a Direction-Finding (DF) system and method.

BACKGROUND OF THE INVENTION

In recent years there is a growing usage of wireless connectivity in almost every device. The growing commercial adoption of the "Internet of Things" (IoT) leads to a situation which multiple device and object types are designed to be coupled with wireless transmitters or wireless sensor nodes in order to enable internet communication on one hand, and direct connectivity to other devices or objects on the other hand. In some cases, the objects comprising the wireless transmitters or the wireless sensor nodes can be electronic devices, such as a mobile telephone, a tablet personal computer, and the like. In some other cases, the objects comprising the wireless transmitters or the wireless sensor nodes may be wearables, clothing and apparel items, furniture's, decorative objects, and the like. Communication between objects and devices utilizing wireless communication has a number of usages, however, in some cases the direction/or the physical location of the objects is required. For example, determining the relative direction of a device measuring environmental conditions such as wind velocity or temperature has a considerable importance to the person who receives the information. Furthermore, in case the wireless sensor nodes transmitting the information are associated with a device carried by a person, the relative direction of the device transmitting the information changes constantly. In such cases, real time direction detection is required in order to determine the current relative direction of the device transmitting the information.

Prior art radio transmission and reception systems relate to the human body in what can be categorized as two contrary approaches: whereas one approach relates to the body as an obstacle that needs to be overcome, the other approach relates to it as an antenna per-se. The common factor of many DF techniques is that within the antennas array of the direction-finding device (DF), it is required that all the antennas will have the same free space towards the target, which direction is desired. It does not mean that there always must be a free line-of-sight between the DF and the target—it means that within the antenna array, there should be no absorbing material between the antennas, so they will be able to "see" the same, and based on the pattern radiations to determine the direction of the signal.

There are many methods known for a Radio Frequency (RF) detector to find the direction of an RF source (Target), mainly using wave analysis methods. These methods can be generally categorized as Direction-Finding (DF) techniques and Monopulse techniques.

DF techniques can be categorized in groups—those which find the target's direction based on received signal amplitude, based on received signal phase, based on received signal timing etc.

For the DF techniques described in general hereunder, the signal does not have to be modulated or bear any kind of information, and may be CW (Continuous Wave) or pulse.

Amplitude-based DF techniques use one or more antennas. An example of a single antenna DF is a rotational directional antenna. The direction, from which the Received Signal Strength (RSS) or Received Signal Strength Indication (RSSI) is the highest, is the expected direction of the target.

Amplitude DF which use several antennas measure the RSS/RSSI at each antenna and calculates the AOA (Angle of Arrival) of the signal using the amplitude differences.

Typical examples of amplitude DF that use several antennas are amplitude monopulse, Adcock, etc. Additional techniques assess the distance of the target, based on the signal strength, and by triangulating several measurements calculate the location of the target.

Phase-based DF techniques use two or more antennas and measure the phase difference of the arrival of a signal in the antennas and calculate from these phase differences the AOA of the signal.

This group includes for example interferometer DF, correlative interferometer DF, etc.

Time-based DF techniques are best known as TOA (Time of Arrival) kind of DF. They use two or more antennas and measure the time difference of the arrival of a signal in the antennas and calculate from these differences the signal's AOA. This group includes for example short and long base TOA, DTOA (Differential Time of Arrival) etc.

Monopulse DF techniques mainly used in ELINT (Electronic Intelligence) systems and radars, to find the direction from which a pulsed radar signal or echo is received. The signal is received in two or more directional antennas. The signals in the antennas, usually highly directional antennas, are added in phase to compose a Sum or S signal and added in opposite phase to compose a Difference or D signal, in one or two dimensions, azimuth, elevation or both. Based on the S and D signal strengths, the direction of the target is found.

U.S. Pat. No. 7,323,996 titled "RFID reader having antenna with directional attenuation panels for determining RFID tag location" describes an antenna structure capable of determining the direction of a radiofrequency identification (RFID) tag, which includes a wide-angle antenna disposed within an attenuator that has regions of low attenuation. The attenuator may include a metal plate with holes. In this case, the antenna only detects RFID tags that are aligned with a hole, and hence the direction of the RFID tag is detected.

SUMMARY OF THE INVENTION

The present invention discloses a direction-finding system and method to determine the relative direction to an RF transmitter by using at least one pair of antennas, at least one of the antennas may be obstructed, or partly obstructed, by an electromagnetic-absorbing material. The RF transmitter may be a wireless device such as a wireless sensor node, a wireless transceiver, RF transmitter, an environmental sensor transmitting information via RF signals, and the like. Such an RF transmitter communicating with the direction-finding system is also defined as a target. The direction-finding system, also defined as a DF system, is designed to conduct a "relative direction determination" process, in order to determine the relative direction from the DF system to the target. In the "relative direction determination" process, the DF system can compare the strength of an absorbed RF signal received the antennas with the strength of a non-absorbed RF signal received by another part of the antennas. The RF signal absorption may result from the electromagnetic-absorbing material which may be associated with the DF system and obstruct at least some of the antennas from receiving the full strength of the RF signal.

At the "relative direction determination" process, the DF system is configured to group the antennas of the DF into antenna pairs having an electromagnetic-absorbing material between the antennas in the pair. The antennas are placed in such manner that the antennas arrangement around the absorbing material is known to the DF system, and a virtual heading for the antenna array is defined. Then the DF system measures the signal strength received by each one of the antennas in the antenna pairs from the direct wireless communication between the DF and a transmitting target, compares the measured signal strength at each antenna, and based on this comparison determines a relative direction from the DF system to the target. A relative direction determination for each such pair is done by associating the direction of the target with the antenna member in the pair having the higher signal strength measured.

Signal transmission disclosed in the subject matter can be performed via a direct wireless communication such as (but not limited to), Bluetooth, Infrared, RFID, NFC, and the like. In some cases, such transmission may be via direct wireless communication implementation of telecommunications network technology such as, Wi-Fi, WLAN, Wi-Max, telephone networks, and the like.

In some cases, an antenna in the DF system can be grouped into more than one antenna pairs. For example, the DF system can group one antenna with a second antenna into a second antenna pair. The DF system can then determine a relative direction to a target for each such pair—and compare or overlap these directions. The DF system may have several pairs aligned in such manner that they cover the same directions—for example, having two pairs of antennas (four antennas in the array) aligned in parallel to each other, having absorbing material between the antennas in each pair. For that matter, the DF system can group any two antennas in its array into pairs and perform the relative direction determination on those two antennas, as long as there is absorbing material between the antennas in the pair.

In some cases, the DF system may determine the relative directions of more than one target. For example, The DF system may have one target transmitting from one direction, and another target transmitting from another direction. The DF system may determine the relative directions individually for each target.

In some cases, the determined relative direction of the target is aligned with an imaginary/virtual line between the two antenna members of the selected antenna pair. The DF system is also designed to store the absorption factor of the electromagnetic-absorbing material. For example, in a possible use case an antenna pair comprising two antennas, one in the front of the human body and one in the back of the human body. The DF system may store the signal strength absorbed by the body as an absorption factor. The absorption factor may be calibrated, for example measured before and after positioning the DF system around the electromagnetic-absorbing material and calculate the difference between the measurements.

The DF system may comprises a central unit and the plurality of antennas that communicate with the target. The plurality of antennas send the measured signal strength received from the target to the central unit which determines the relative direction of the target according to the values received from the plurality of antennas.

In some embodiments of the present invention the electromagnetic-absorbing material which the DF system is associated with may be a living material such as a human body. For example, a number of antennas of the DF system can be embedded in a shirt worn by a person. In that case, the electromagnetic-absorbing material may be the body of the person wearing the shirt. In some cases, the electromagnetic-absorbing material may be parts or organs of the human body or limbs, such as arms, legs, and the like. In some other cases, the electromagnetic-absorbing material may comprise synthetic material, such as fabric, plastic, glass, and the like.

The DF system may also include or transmit the DF system findings to an interface device. Such an interface may be a screen, a mobile device, a computer, a tablet personal computer, and the like.

As opposed to Monopulse techniques, which use high-gain narrow beam-width and hence large antennas, the methods of the subject matter can use omnidirectional. The advantage is that very small antennas can be used, as small as being implemented in a personal electronic device such as a cellular telephone device, PDA, digital camera, a remote-control device, as well as in wearable's, clothes, etc.

As opposed to prior-art DF techniques that need expensive receivers, (usually one receiving channel per each antenna) and operate on the IF (Intermediate Frequency) of the received signal, the methods of the subject matter operate directly on the RF (Radio Frequency), uses a small quantity of electronic non-expensive devices and is therefore much smaller and cheaper.

As opposed to prior-art DF techniques, HISEP's techniques use existence of wireless communication vs. loss of wireless communication rather than signal strength. The methods of the subject matter are generic and can be used for any wireless communication standard or protocol, including those devices that do not support RSSI.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF THE INVENTION

Figure 1A:
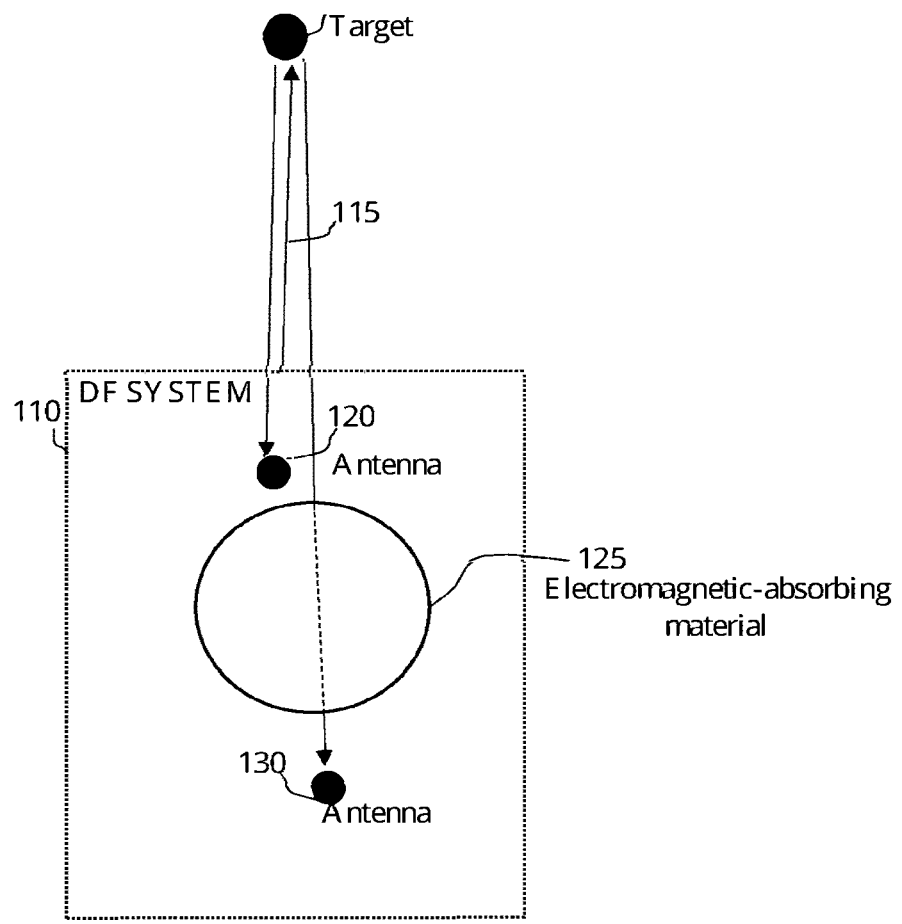
FIG. 1A shows a DF system for measuring a relative direction of a target, according to exemplary embodiment of the present invention.

The present invention discloses a DF system and method to determine the relative direction of a target by utilizing electromagnetic-absorbing material and at least two antennas. The DF system comprises at least a pair of antennas designed to receive RF transmissions, a computerized unit configured to collect the RF signals received by the antennas and a memory unit to store the information received during the "relative direction determination" process. Such information may be directions of the targets, the number of targets, the absorption factor of the electromagnetic-absorbing material, the heading of the DF system, the alignment of the antennas versus each other and versus the absorbing material, and optionally additional information which may be related to the "relative direction determination" process. The DF system is designed to utilize a power source from an internal source such as a battery. In some cases, the DF system may be connected to an external power source such as the electric grid.

The electromagnetic-absorbing material associated with the DF system may be surrounded, in some cases, by the antennas, or in some other cases, the antennas may be scattered in the close vicinity of the electromagnetic-absorbing material. For example, in case of a DF system comprising four (4) antennas, the antennas may be scattered around, surrounding an electromagnetic-absorbing material which can absorb the RF signal and attenuate the transmission strength received from a target. The signal strength measurement performed by the DF system, may utilize any method to measure the received signal strength in a wireless environment, such as RSSI or any other signal strength measuring method known to a person who has ordinary skills in the art.

The DF system is also designed to conduct the "relative direction determination" process by comparing the results generated from more than one antenna pair and to determine the relative direction accordingly. The DF system is also designed to conduct the "relative direction determination" process by integrating the results generated from more than one antenna pair and to determine the relative direction accordingly. The DF system may determine that the relative direction is an arithmetic manipulation on the two candidate antennas, for example the mean direction of the two antenna members, of the selected antenna pairs.

In some cases, the antennas are embedded in a person's cloth—such as (but not limited to) a shirt, and the body of the person wearing the shirt functions as the electromagnetic-absorbing material. The DF system may have a first antenna pair having one antenna placed in the front of the shirt (the person's chest area) and one antenna placed in the back of the shirt, and a second antenna pair with antennas placed, one in the right side area of the shirt and one in the left side of the shirt. The DF system may select both antenna pairs and determine that the target is located in the front and left the person, according to the measured differences in signal strength. In yet another example, the DF system may have a first antenna pair having one antenna placed in the front of the shirt (the person's chest area) and one antenna placed in the back of the shirt, and a second antenna pair with antennas placed, one on the shoulder part area of the shirt and one in the armpit part of the shirt. The DF system may select both antenna pairs and determine that the target is located in the front and above the person, according to the measured differences in signal strength.

The term "Direction finder or DF or Looker" refers to a device and/or object and/or thing having Wireless Communication means (such as, but not limited to, TOT) with a single antenna, which is used to determine the relative direction to a Target as defined herein under. Alternatively the device is used to find whether one or more Targets are located within a desired direction from the finder. Said DF can be a stand-alone device or integrated into another electronic device, either via software or hardware or a combination of both. A Looker device can also function as a Target. Said Looker may include a compass component and/or Accelerometer and/or Gyro and/or Tilt sensors and/or an AM.

The term "Target" refers to a device and/or object and/or thing having Wireless Communication means (such as, but not limited to, TOT), or an RF communication source, which comprises RF transmitter and/or receiver and/or repeater or transponder and/or tag, which communicates wirelessly directly (i.e., not via relays) with the DF, and which also comprises an antenna module. A Target device can also function as a Looker. Said Target may include a compass component and/or Accelerometer and/or Gyro and/or Tilt sensors.

The term "Heading" refers to a virtual pre-determined direction, in relation to a physical element in the Target or Looker device, that will be regarded as the "zero point heading" of the AM, and will be used to illustrate the "Heading" Target or looker device. Said Heading can correlate with a device's display shape or position.

The term "Tilt sensor" refers to a device and/or component that can measure the tilting in often two axes of a reference plane in two axes, in portable electronic devices—such as, but not limited to, cellular phone, video game controllers/console, digital camera, GPS device, media player, laptop computer, tablet computer, wireless remote control, PDA—to detect the position of the device or provide for game input.

The term "Absorbing material" refers to the weakening and/or reduction in strength and/or attenuation of a wireless signal/wave—all of it or part of it—that occurs as it passes through objects and/or lossy medium and/or materials with dielectric loss properties (such as, but not limited to, the human body and/or materials with absorbing properties). Said Absorbing material may have pre-defined properties corresponding with the wave type and/or frequency it is aimed to absorb.

FIG. 1A shows a DF system for measuring a relative direction of a target vs. the DF's heading, according to exemplary embodiment of the present invention. The DF system 110 comprises antenna 120 and antenna 130, having an electromagnetic-absorbing material 125 between them, which is part of the DF system 110. The DF system 110 may determine the relative direction to a target 105 by grouping the antennas 120, 130 into an antenna pair and compare the measured signal strength received in each of the antennas. In some cases, additional antennas may be added to the DF system 110. Thus, the DF system 110 is designed to include or communicate with more antennas and group them to antenna pairs. The target 105 may transmit RF transmissions and communicate with other wireless devices. The wireless devices may be such as, DF system, wireless sensor nodes, RF receivers, RF transceivers, and the like. The electromagnetic-absorbing material 125 resides between antenna 130 and antenna 120 and may absorb the signal strength received from target 105. The electromagnetic-absorbing material 125 is not limited to any shape or structure.

The antennas 120 and 130 may be grouped as an antenna pair according to the relative location of the Target vs. the antennas in the pair and the Absorbing material between them, Antenna 130 may receive a weaker signal strength than antenna 120, since the RF signal may be absorbed by the electromagnetic-absorbing material 125. Antenna 120 may be unobscured by the electromagnetic-absorbing material 125 versus the target 105 and may receive a stronger signal strength than antenna 130, due to the electromagnetic-absorbing material 125. FIG. 1A also shows arrow 115 which illustrates a heading of the DF system 110. The DF system 110 may determine that the relative direction of target 105 correlates with its heading 115, as the signal strength measured at antenna 130 is weaker than the signal measured at antenna 120 as the signal strength received by antenna 130 was attenuated by the electromagnetic-absorbing material 125.

The DF system 110 also comprises a central unit (not shown) communicating with the antennas 120, 130 that communicate with the target in direct wireless communication via the antennas. The antennas measure the signal strength received from the target and transmit the signal strength to the central unit. The central unit may also comprise a processing module for performing the methods of the present invention, for example any sort of analysis and calculation. The central unit may also comprise a memory for storing information, for example calibrated absorption of the electromagnetic-absorbing material 125, prior measurements from the antennas in the DF system and the like.

Figure 1B:
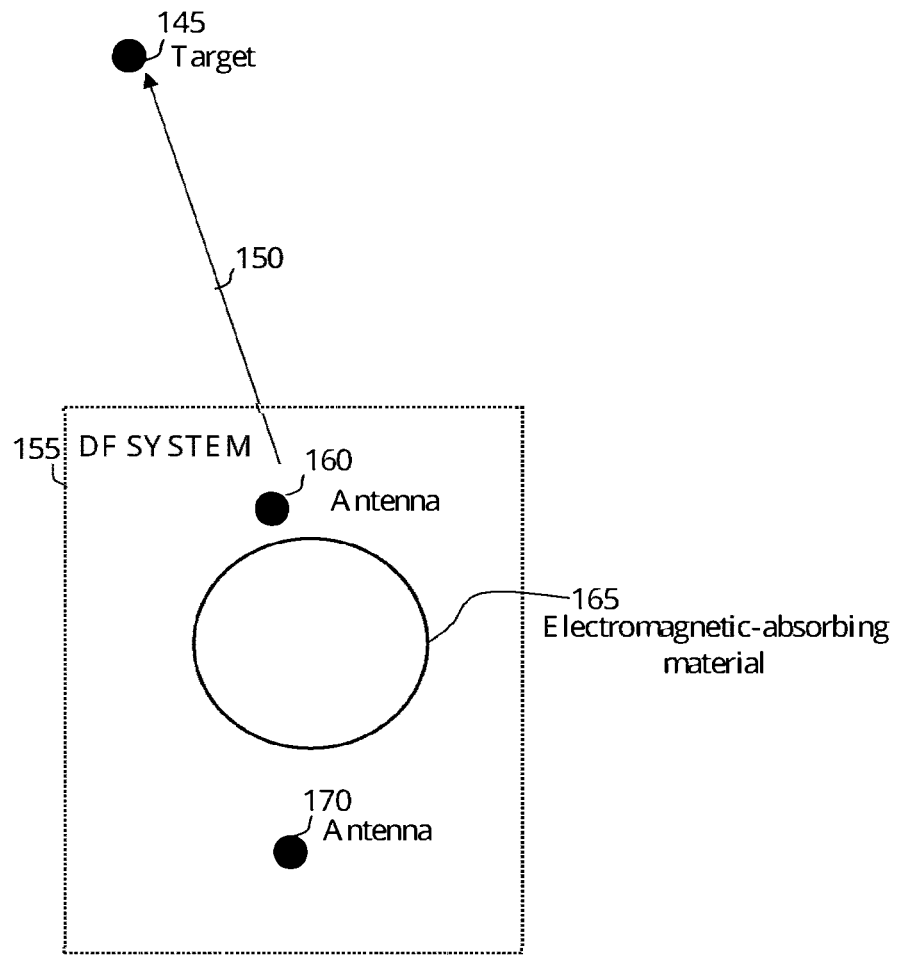
FIG. 1B shows a DF system measuring a different relative direction of a target, according to exemplary embodiment of the present invention.

FIG. 1B shows a DF system measuring a different relative direction of a target vs. the DF's heading, according to exemplary embodiment of the present invention. DF system 155 comprising antenna 160 and antenna 170, having an electromagnetic-absorbing material 165 between them. FIG. 1B also shows target 145 directly communicating with antennas included in the DF system 155. In some cases, target 145 may move and change its relative location. In such case, the DF system 155 may operate the relative direction determination process and determine the new relative direction of target 145, as shown in arrow 150.

Figure 2A:
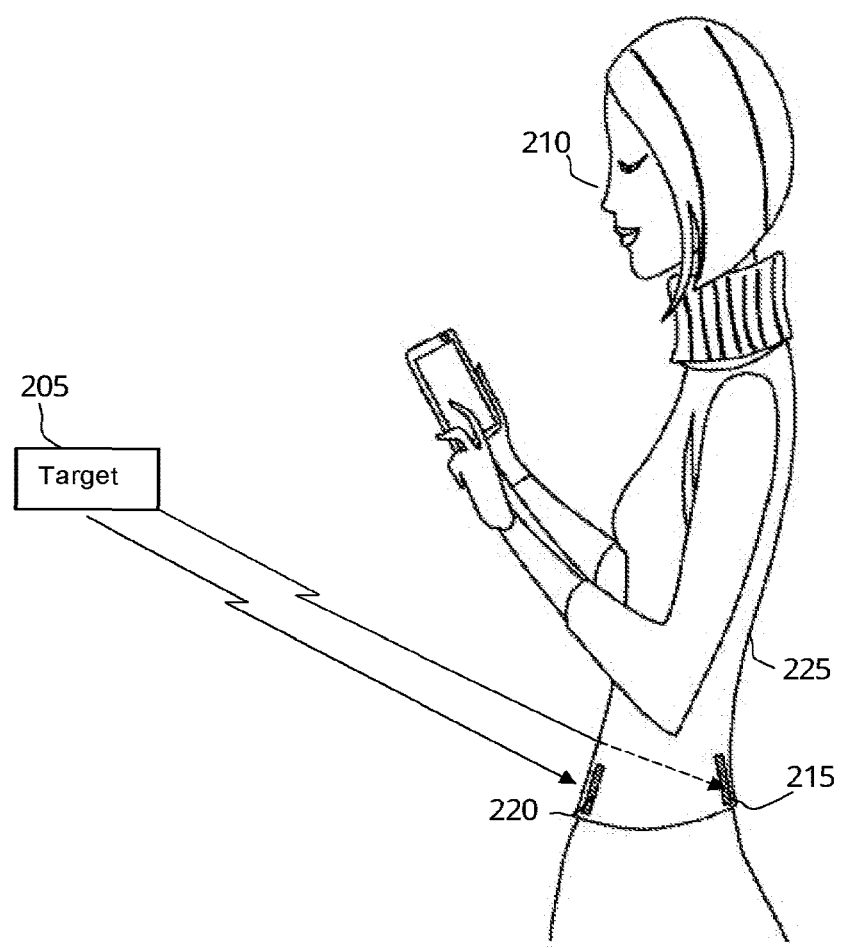
FIG. 2A shows a person with a DF system having one antenna pair placed in her clothes and receive an RF transmission from a target, according to exemplary embodiments of the present invention.

FIG. 2A shows a person with a DF system having one antenna pair placed in her clothes and receive an RF transmission from a target, according to exemplary embodiments of the present invention. For example, antenna 215 and 220 may be grouped as an antenna pair and receive RF signals from a target 205. In such cases, the DF system may define a heading to the DF system associated with the item into which the system is implemented to. In this use case, the DF system heading may be defined as the front of the cloth, which inherently is also the front of the person wearing the cloth. In such case, the person's body 210 may function as the electromagnetic-absorbing material. For example, the body of the person functions as the absorbing material, in such manner that it absorbs (for example) 21 dB of the Target's signal strength, resulting in antenna 215 receiving an RF signal from the target 205 in a signal strength of −88 dB, and antenna 220 receiving an RF signal from the target 205 in a signal strength of −67 dB.

Figure 2B:
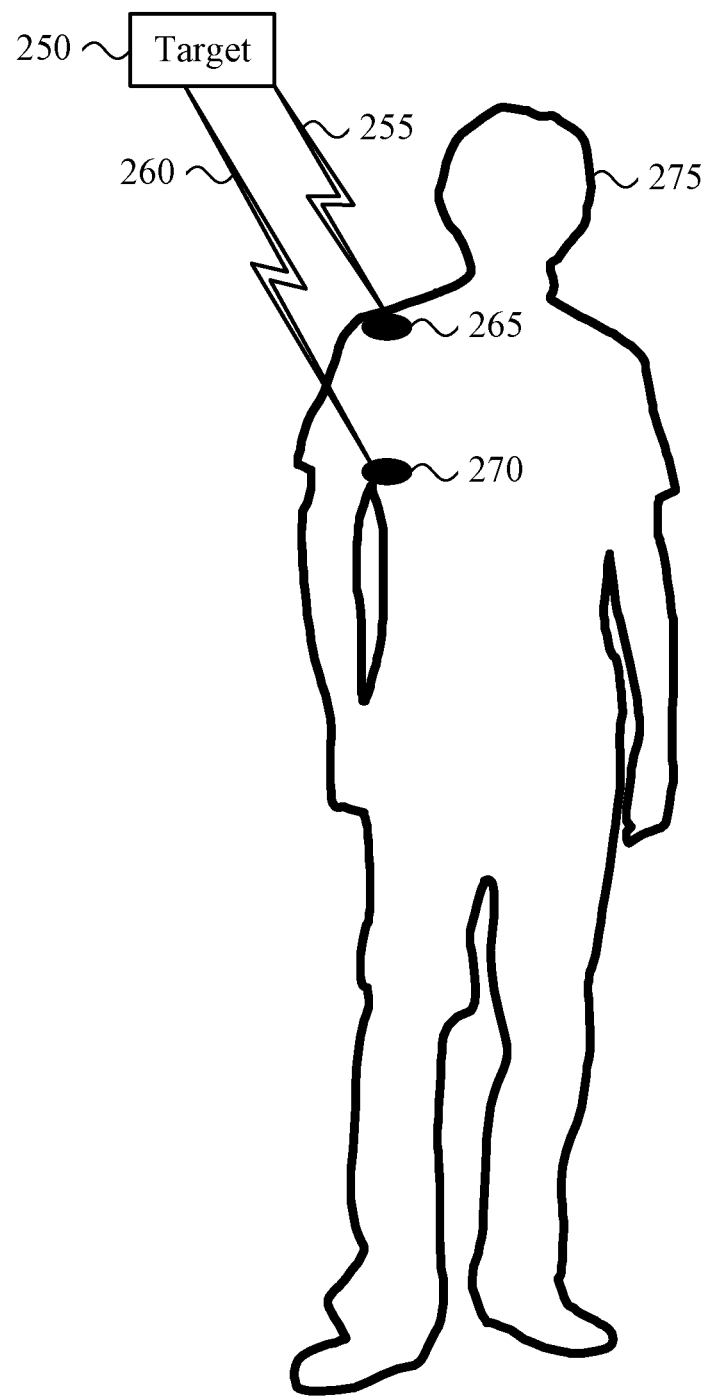
FIG. 2B shows a person with one antenna located at the shoulder and one antenna located in the armpit, according to exemplary embodiments of the present invention.

FIG. 2B shows a person with one antenna located at the shoulder and one antenna located in the armpit, according to exemplary embodiments of the present invention. The person 275 is shown along with two antennas 265 and 270 located in the person's clothes. Antennas 265 and 270 are connected to a DF system and utilized to determine the relative direction of a target. For example, antennas 265 and 270 may be grouped as an antenna pair and receive RF signals 255, 260 from a target 250. In such a case, the person 275 may function as an electromagnetic-absorbing material. For example, antenna 270 may receive an RF signal from the target 250 in a signal strength of −93 dB, and antenna 265 may receive an RF signal from the target 250 in a signal strength of −75 dB.

Figure 3:
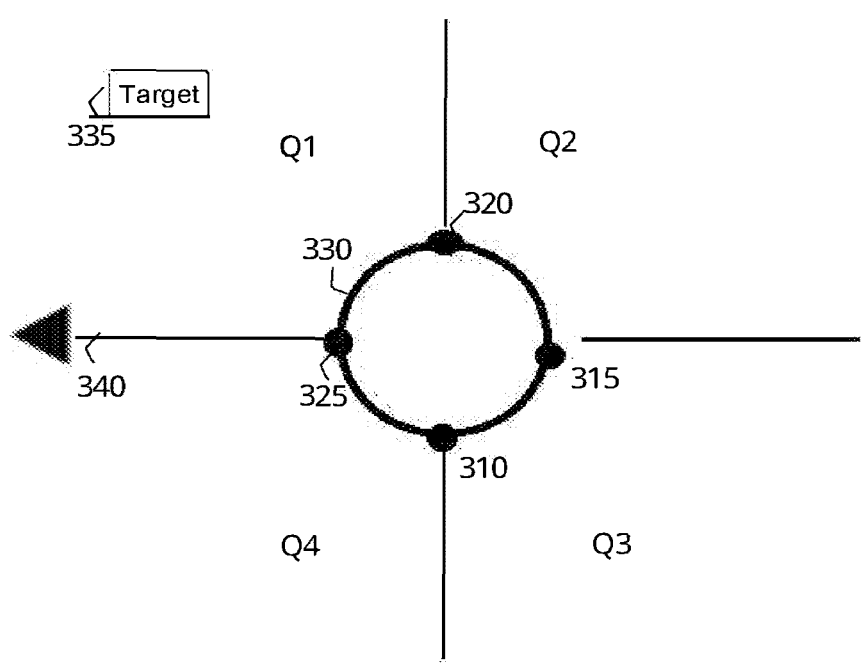
FIG. 3 shows a relative direction determination of a target utilizing 2 antenna pairs, according to exemplary embodiments of the present invention.

FIG. 3 shows a relative direction determination of a target utilizing 2 antenna pairs, according to exemplary embodiments of the present invention. FIG. 3 shows an electromagnetic-absorbing material 330 which, in some cases, can be a living medium material such as a person's body, and antennas 310, 315, 320, and 325 located in proximity near electromagnetic-absorbing material 330. Antennas 310, 315, 320, and 325 can be grouped into antenna pairs, in order to determine relative directions of targets, such as target 335. For example, antenna 325 and antenna 315 may be grouped into one antenna pair, and antenna 320 and antenna 310 may be grouped into another antenna pair.

Both of the antenna pairs can be utilized in the relative direction determining process. For example, in case target 335 transmits an RF signal, an antenna pair comprising antenna 325 and antenna 315 may be utilized to determine that target 335 may be in the front of the electromagnetic-absorbing material 330. The DF system may utilize the antenna pair comprising antenna 820 and antenna pair 310 to determine that target 335 may be at the right side of the electromagnetic-absorbing material 330, assuming the DF system have its heading directed forward towards direction 340, as shown in FIG. 3. In some cases, the determination of the location may be performed using the antenna pair comprising antennas 325 and 315 first, and then using the antenna pair comprising antennas 320 and 310. In some other cases, the relative direction determination process may utilize both of the antenna pairs simultaneously.

Figure 4:
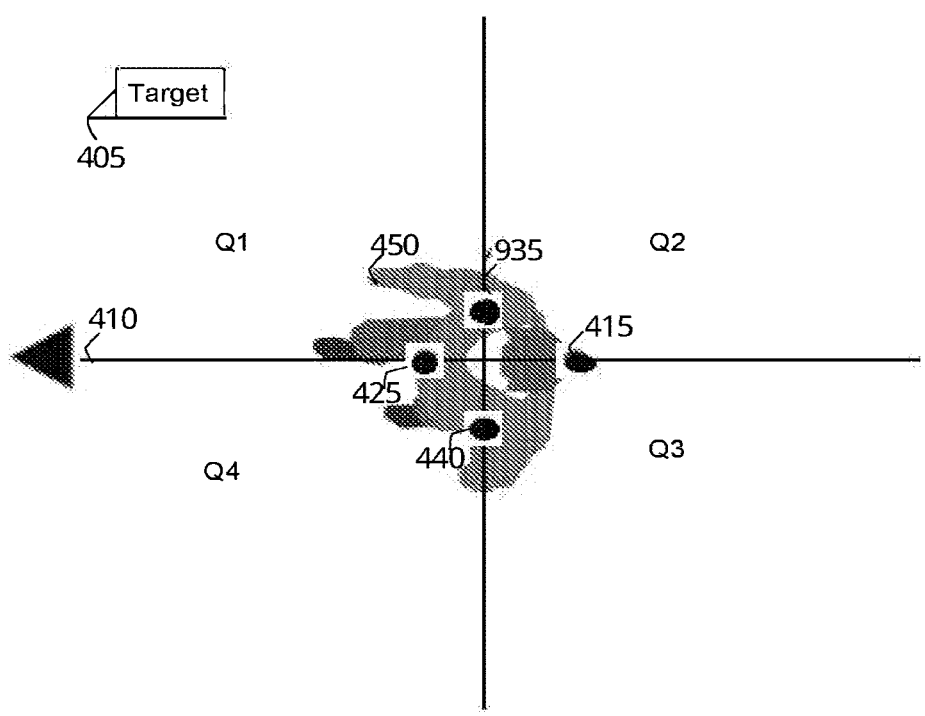
FIG. 4 shows a top view of a person wearing a wearable item with a DF system comprising 4 antennas, allocated as two antenna pairs, according to exemplary embodiments of the present invention.

FIG. 4 shows a top view of a person wearing a wearable item with a DF system comprising 4 antennas, allocated as two antenna pairs, according to exemplary embodiments of the present invention. Antennas 440, 415, 425, and 435 are located on a wearable item used by a person 450, as the person's body 450 functions as the electromagnetic-absorbing material. FIG. 4 also shows the heading 410 of the DF system, which is aligned with the natural heading of a person 450. Antennas 440, 415, 425, and 435 can be grouped into antenna pairs, in order to determine relative directions of targets, such as target 405. In some cases, the DF system may perform an artificial division of the area around person 450 into virtual quarters. For example, the area around person 450 may be divided to quarters denoted Q1, Q2, Q3, and Q4 to specify the relative direction of target 405 versus the person 450. In some cases, such division may be utilized to present the relative direction in a screen of the DF system or a computerized device, such as (but not limited to) a computer, a mobile telephone, a tablet personal computer and, and the like. Thus, the relative location of the target may be defined by a quarter, which facilitates the person to identify the general location of the target 405. The quarters may be defined according to the heading 410.

Figure 5:
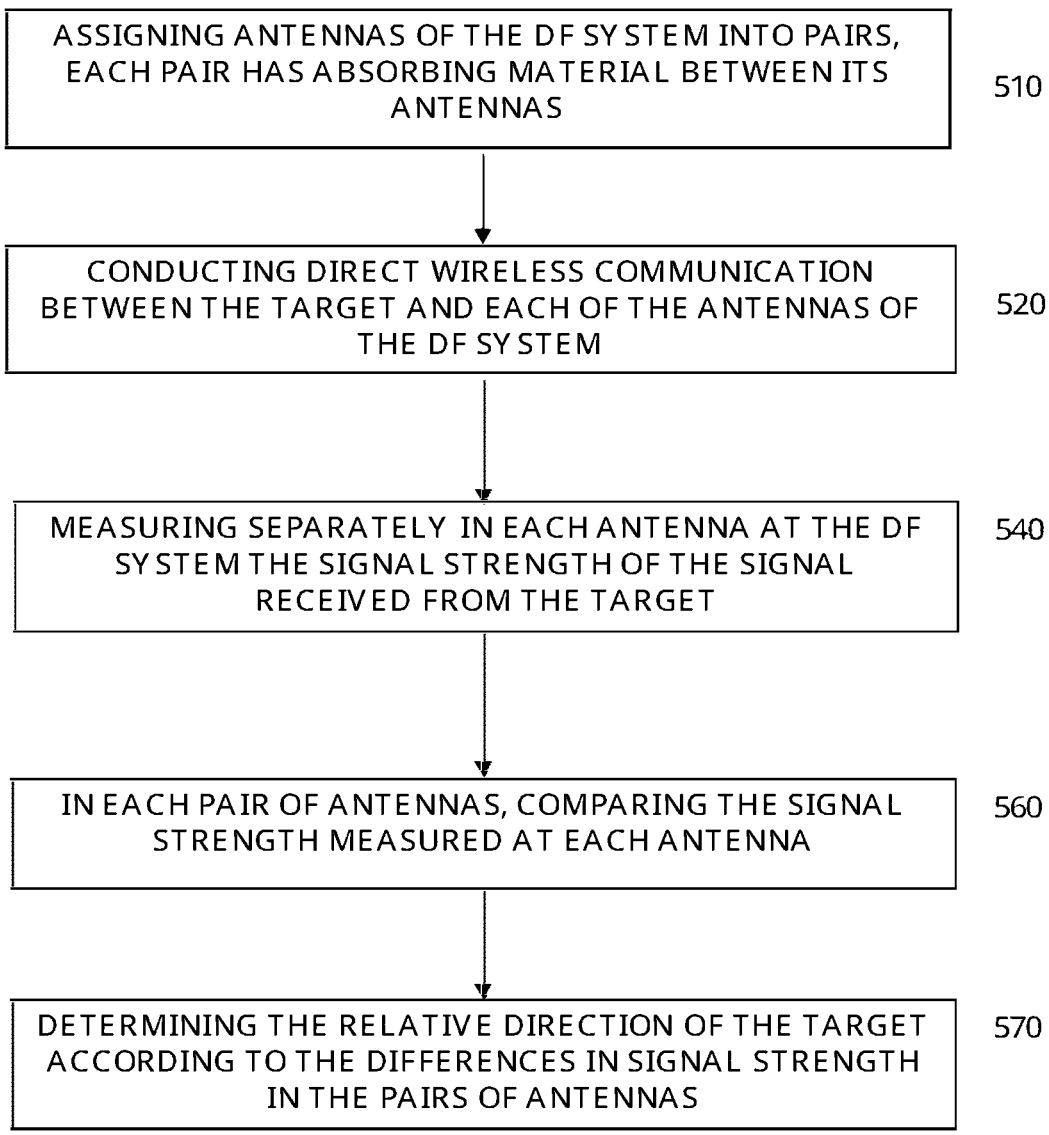
FIG. 5 discloses a method for determining the relative direction of a target, according to exemplary embodiments of the current invention.

FIG. 5 discloses a method for determining the relative direction of a target, according to exemplary embodiments of the current invention. Step 510 discloses assigning antennas of the DF system into pairs, having absorbing material between the antennas in the pair. Step 520 discloses conducting direct wireless communication between the target and the DF system via each one of the antennas in the pair. Step 540 discloses measuring at the DF system the signal strength of the signal received from the target separately at each antenna in the pair. Step 560 discloses in each pair of antennas, comparing the signal strength measured at each antenna. Step 570 discloses determining the relative direction of the target according to the differences in signal strength in the pairs of antennas.

Figure 6:
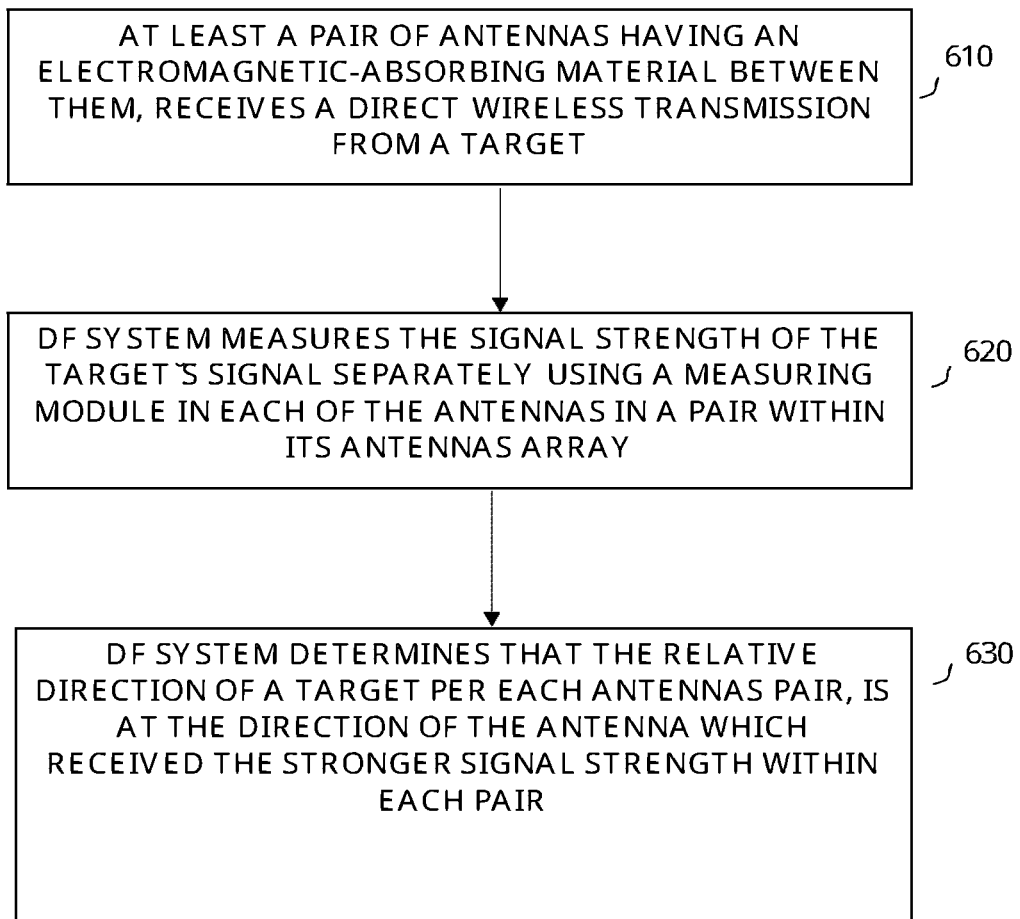
FIG. 6 discloses the relative direction determination process conducted by the DF system, according to exemplary embodiments of the present invention.

FIG. 6 discloses the relative direction determination process conducted by the DF system, according to exemplary embodiments of the present invention. In step 610, the DF system comprises at least a pair of antennas having an electromagnetic-absorbing material between them, receiving a direct wireless transmission from a target.

In step 620, the DF system measures the signal strength of the target's signal antenna separately using a measuring module in each of the antennas in a pair within its antennas array. For example, in case a DF system comprises 6 antennas, the DF system may be configured with the 6 antennas grouped to at least 3 pairs. The signal strength measurement process may be performed separately by each antenna in each antenna pair as they may be grouped and defined in the DF system. Grouping the antennas to antenna pairs may be performed, in some cases, via a manual procedure or according to antennas' locations versus the absorbing material. In some other cases, the DF system may utilize an automatic procedure, such as a computerized procedure, to perform the antenna grouping process. The antennas grouping process may be configured to ensure that the antenna pairs comprise two antennas in a fashion that the two antenna members of each antenna pair have minimal absorbing material between them, for example in opposite sides of the electromagnetic-absorbing material associated with the DF system. For example, in case a DF system comprises 4 antennas embedded in trousers, the antennas may be grouped into two antenna pairs, the first pair has one antenna placed in the front portion of the trousers and one antenna placed in the back portion of the trousers, and the second pair has one antenna placed in the left side of the trousers and one antenna placed in the right side of the trousers. In some cases, one antenna can be assigned to more than one pair.

Step 630 discloses a process of determining the relative direction of a target according to the signal strength difference between the two antennas of the antenna pairs. The DF system may determine that the target is in the direction of the antenna member which received the stronger signal strength of a selected pair. For example, in case the selected pair comprises one antenna member which receives a signal strength of −55 dB and the other antenna member which receives a signal strength of −80 dB, the target may in the direction to the antenna which receives a signal strength of −55 dB.

Figure 7:
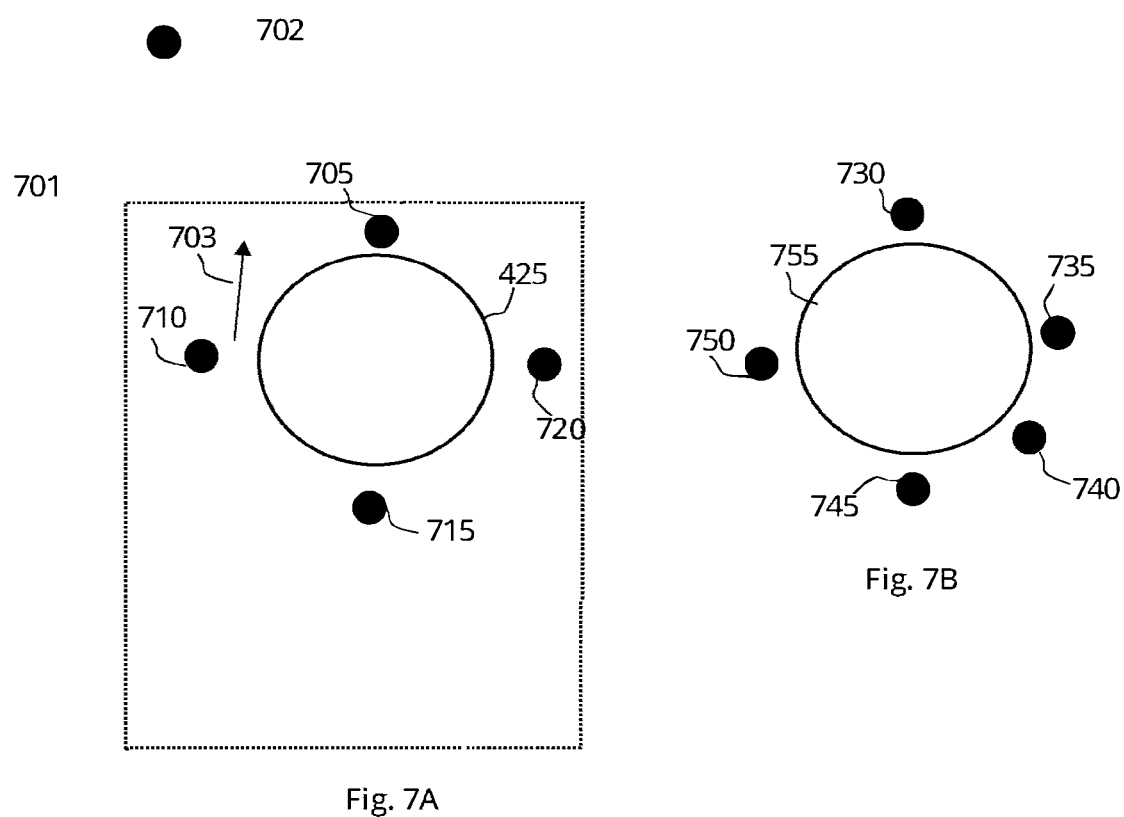
FIG. 7A shows an upper view of a DF system with an antenna array having more than two antennas designed to receive RF transmissions from targets and located around an electromagnetic-absorbing material, according to exemplary embodiments of the present invention.
FIG. 7B shows an odd number of antennas designed to receive RF transmission from targets having an electromagnetic-absorbing material between them, according to exemplary embodiment of the present invention.

FIG. 7A shows an upper view of a DF system with an antenna array having more than two antennas designed to receive RF transmissions from targets and located around an electromagnetic-absorbing material, according to exemplary embodiments of the present invention. Antennas 705, 710, 715, and 720 can be grouped into antenna pairs and receive RF transmission from a target. For example, antenna 705 and antenna 715 may be grouped into one pair, and antenna 710 can be grouped with antenna 720 into another pair. In some cases, one of the antennas can be grouped into more than one pair, as long as they have the absorbing material 725 between them. For example, antenna 705 can be grouped with antenna 710 to one antenna pair and be grouped with antenna 715 to another antenna pairs. FIG. 7A also shows electromagnetic-absorbing material 725 that obstructs some of the antennas 705, 710, 715, and 720. For example, in case a target is located at the direction of antenna 705, the RF signal may be attenuated for antenna 715 because of the electromagnetic-absorbing material 725. In some other cases, more than one antenna may be obstructed.

According the FIG. 7A, a DF system 701 may have a pre-defined heading 703. Said heading can be defined as directions such as "front" (in the direction of arrow 703), "back" (in the opposite direction of arrow 703), "right" or "left" accordingly. Said heading may also be defined in angles, in such manner that the heading direction of the DF system 701 is 0 degrees, and going clock-wise, is 90, 180, and 270 degrees accordingly. When the DF system 701 receive a signal from target 702, via its antennas 705, 710, 715, 720, a direction to the target may be determined, by comparing the signal strength between antennas 705 and 715, and between 710 vs 720. Given the absorbing material between each compared pair, the DF system 701 will determine that the signal received at 705 is stronger than received at 715, thus determining that target 402 is at "front" heading. Given the absorbing material between each compared pair, the DF system 701 will determine that the signal received at 710 is stronger than received at 720, thus determining that target 702 is at "left" heading. Combining these determinations at the central unit, may result in determining that target 702 is positioned in the front and left of the DF system 701.

FIG. 7B shows an odd number of antennas designed to receive RF transmission from targets having an electromagnetic-absorbing material between them, according to exemplary embodiment of the present invention. FIG. 7B shows antennas 730, 735, 740, 745 and 750 which can be grouped into antenna pairs and receive RF transmission. For example, antenna 750 can be grouped into a pair with antenna 735. FIG. 7B also shows electromagnetic-absorbing material 755 that obstructs some of the antennas 730, 735, 740, 745 and 750.

The antenna pairs can be used to improve both reliability and reduce the sector size/width of relative direction in which a Target may be. The pairs may be used to verify the results of calculating signal strength difference of other pairs. The pairs may be used to create overlapping sectors of relative directions. In addition, the system may be used in such manner that a specific antenna can be selectively paired with other antennas—not necessarily antennas that are opposite. For example, a specific front antenna may be used to compare results versus three different back antennas (instead of using three pairs of antennas as each pair contains a front antenna and back antenna).

Figure 8:
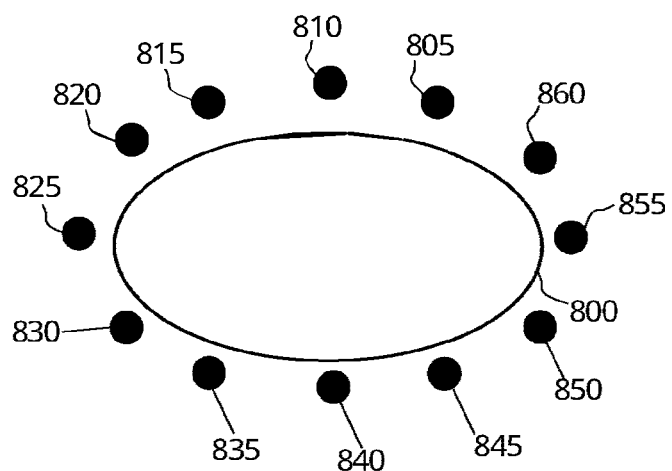
FIG. 8 demonstrates a plurality of antennas designed to receive RF transmissions from targets and located in proximity to an electromagnetic-absorbing material, according to exemplary embodiments of the present invention.

FIG. 8 demonstrates a plurality of antennas designed to receive RF transmissions from targets and located in proximity to an electromagnetic-absorbing material, according to exemplary embodiments of the present invention. Antennas 805, 810, 815, 820, 825, 830, 835, 840, and 845 can be grouped to antenna pairs and receive RF transmission. In some cases, the antenna pairs may comprise two antennas in opposite sides on the absorbing material. For example, antenna 820 may be grouped with antenna 850 which is located in the opposite side of the electromagnetic-absorbing material 800.

Figure 9:
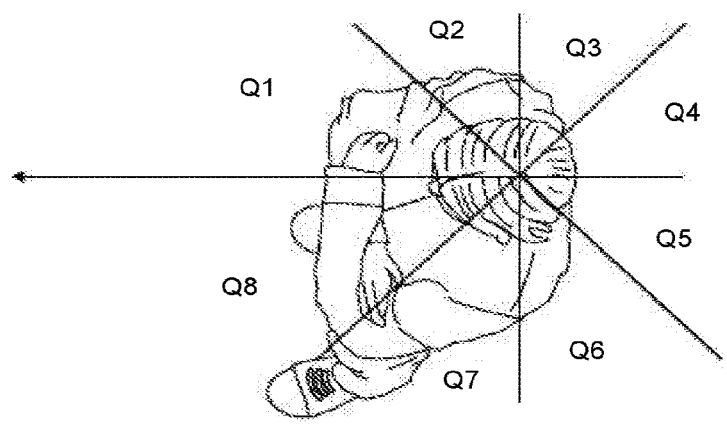
FIG. 9 demonstrates the DF system area covered by the DF system, the area is virtually divided into multiple sectors, according to an exemplary embodiments of the present invention.

FIG. 9 demonstrates the DF system area covered by the DF system, the area is virtually divided into multiple sectors. In some cases, each sectors may be covered by more than a single an antenna pair.

Figure 10:
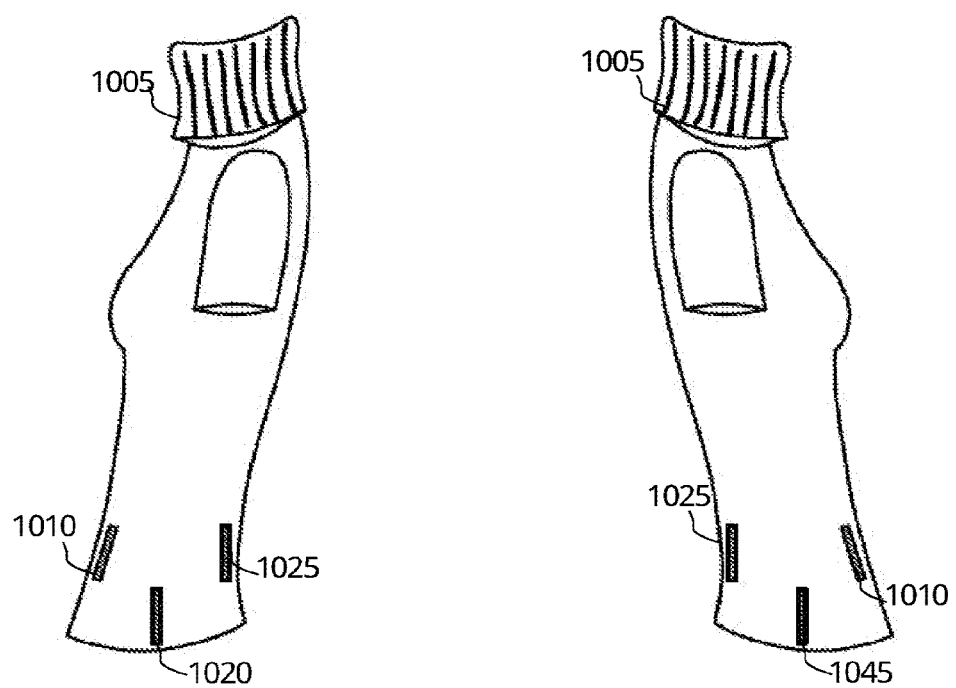
FIG. 10 demonstrates antennas placed in a person's shirt and functioning as a DF system, according to an exemplary embodiments of the present invention.

FIG. 10 demonstrates antennas placed in a person's shirt and functioning as a DF system, according to an exemplary embodiments of the present invention. FIG. 10 shows different views of the same shirt, shirt 1005, having 4 antennas placed therein, front antenna 1010, rear antenna 1025, right antenna 1045 and left antenna 1020. The shirt may function as DF system and target.

In some other cases, shirt 1005 can function as a DF system and receive information being transmitted from a transmitter embedded in shirt 1005. Shirt 1005 can also function as DF system and a target simultaneously. For example, antennas 1010 and 1020 can be grouped into an antenna pair and receive RF transmission.

Figure 11:
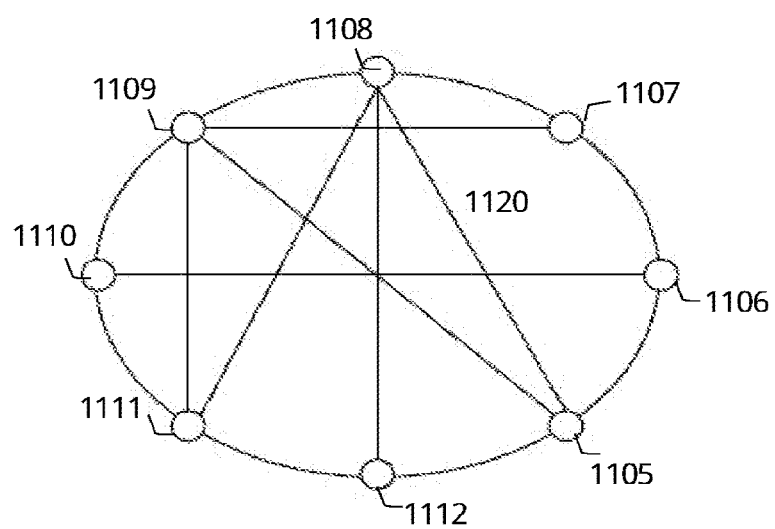
FIG. 11 shows an electromagnetic-absorbing material and a number of antennas and having an electromagnetic-absorbing material between them, according to an exemplary embodiments of the present invention.

FIG. 11 shows an electromagnetic-absorbing material and a number of antennas 1105, 1106, 1107, 1108, 1109, 1110, 1111, and 1112 having an electromagnetic-absorbing material 1120 between them, and grouped into pairs, according to exemplary embodiments of the present invention. In some cases, the antenna members may be positioned in opposite sides of the electromagnetic-absorbing material 1120, as shown in the antenna pair containing antennas 1106 and 1110. In some other cases, the antenna pairs may contain antenna that are in a relatively close proximity to one another, as shown in antenna pair containing antennas 1109 and 1107.

Figure 12:
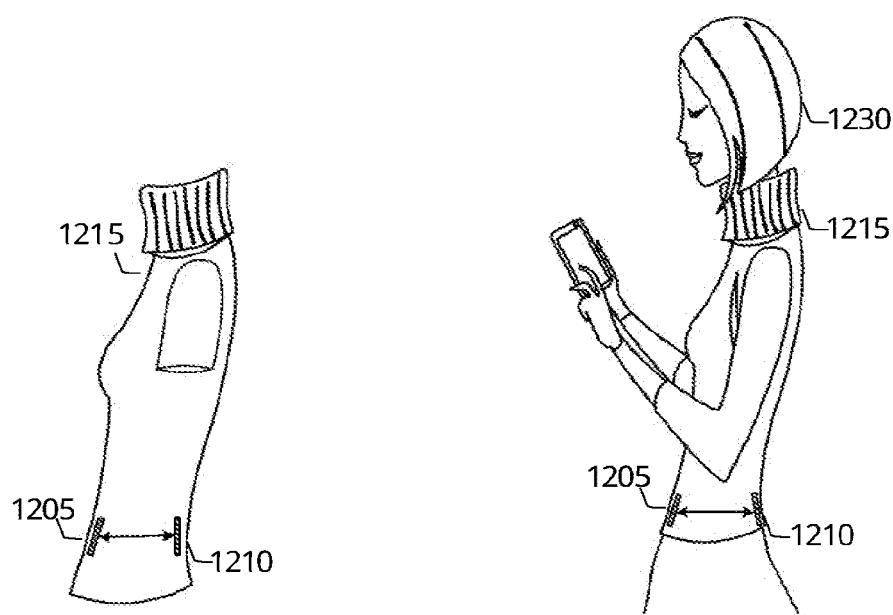
FIG. 12 demonstrates a method of calibrating the DF system, according to exemplary method of the present invention.

FIG. 12 demonstrates a method of calibrating the DF system, according to exemplary method of the present invention. FIG. 12 shows a shirt 1215 embedded with antennas 1205 and 1210. FIG. 12 also demonstrates a person 1230 with the shirt 1215 embedded with the same antenna 1205 and 1210. Calibration begins when placing the DF apparatus in or on the shirt 1215 having free space between the two positions of the two antennas in the pair. For example, an extra-large shirt contour may have 25 centimeters of free space between its front and back sides, where the front antenna and the back antenna are positioned. Then, each antenna WITHIN the Looker's system wirelessly communicate with its pair antenna, and the signal strength measured correspondingly at each antenna is logged, and may be used as a reference to the difference in signal strengths. Then, the antennas in the pair communicate after the person 1230 wears the shirt 1215 and the signal strengths are measured. The person 1230 functions as the absorbing material. Then, the difference between the measurements is used to indicate the absorbing factor of the person 1230. The measurement is customized for the specific person 1230. For example, for one user at 2.4 Ghz, his body absorption may be 15 dB for a specific antenna pair, while for another it might be 25 dB for the same pair.

The customized measurement may be added to a storage of the DF system and can be used in the method of determining the relative direction of a Target. When the Target is more or less on the same "line" between the Looker's antennas, the measured difference within the Looker's antennas should be reflected in the results of the communication of each antenna with the Target. For example, if said customization process measured absorption of 15 dB due to the users' body, when the Target is approximately on the same virtual line as the 2 antennas, the difference between the signal strength of the Target measured at each such Looker antenna should be also near 15 dB. If said difference of the Target measured signal is below the customization measurement, it may indicate that the Target is not necessarily on the same "virtual line", and the system may selective choose to ignore and/or use data from other pairs and/or determine that the Target's relative direction is to either side of the said "virtual line";

Said comparison of the measured difference during the relative determination process vs. the stored calibrated data may be used as a quality factor indicator to increase reliability of the direction determination. In accordance with the example above, having 15 dB difference in both calibration and in the relative determination process may be given a higher quality factor of the direction determination.

Figure 13:
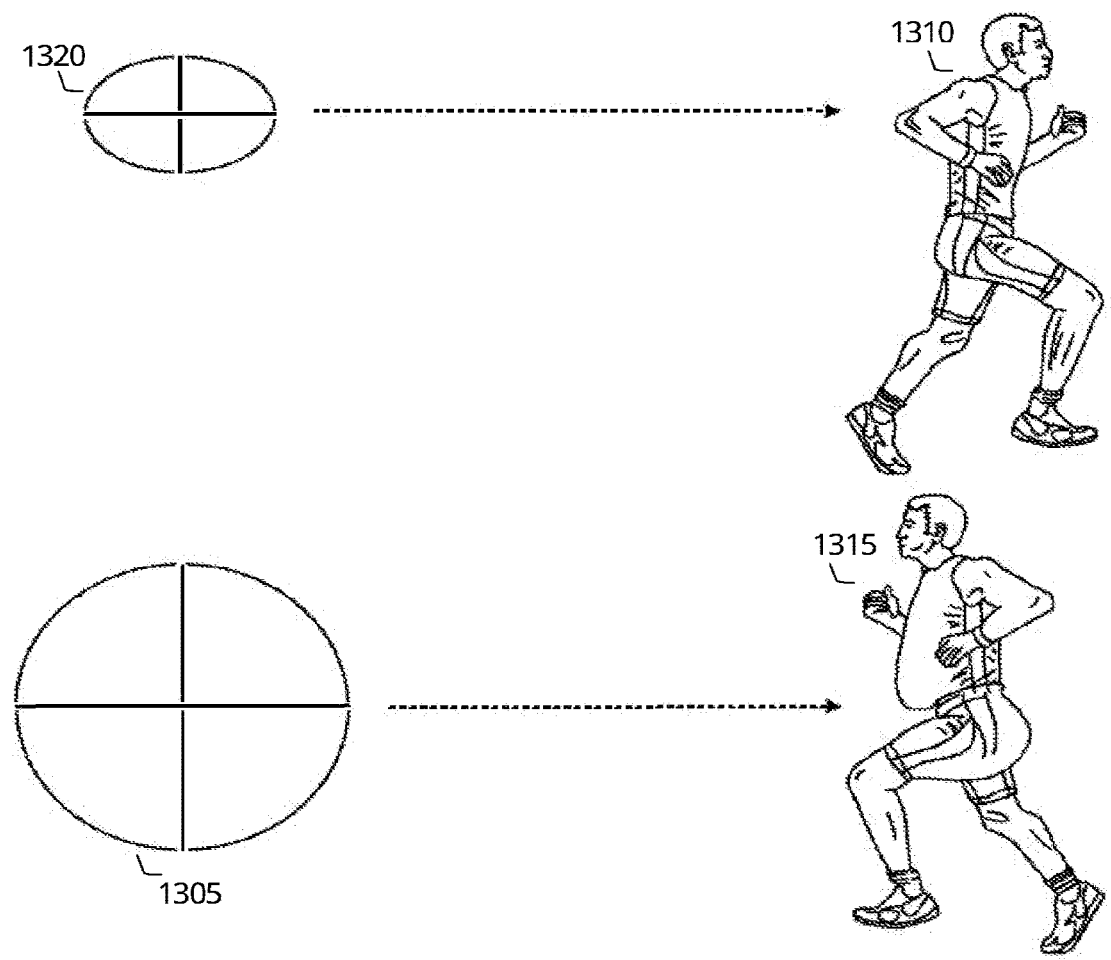
FIG. 13 demonstrates two persons with different body shapes and therefore a different absorption factor, according to exemplary embodiment of the present invention.

FIG. 13 demonstrates two persons with different body shapes and therefore a different absorption factor, according to exemplary embodiment of the present invention. First person 1315 may wear a shirt embedded with antennas that may be connected to a DF system. The first person 1315 body shape is represented by round shape 1305. The DF system that may be connected to the antennas embedded in the shirt of first person 1315 can detect the absorption factor of the person's 1315 body, store it in the DF system, and utilize it in the "relative direction determination" process. For example, in case a target is detected to be in the front of the first person 1315, and the measured absorption factor is smaller than the stored absorption factor, the DF system may operate the "relative direction determination" process and select a different antenna pair, or antenna pairs. FIG. 13 also shows another person 1310 having body shape represented by ellipse 1320. In case body shape 1320 is different than body shape 1305, the absorption factor stored by the DF system may be different.

Figure 14A:
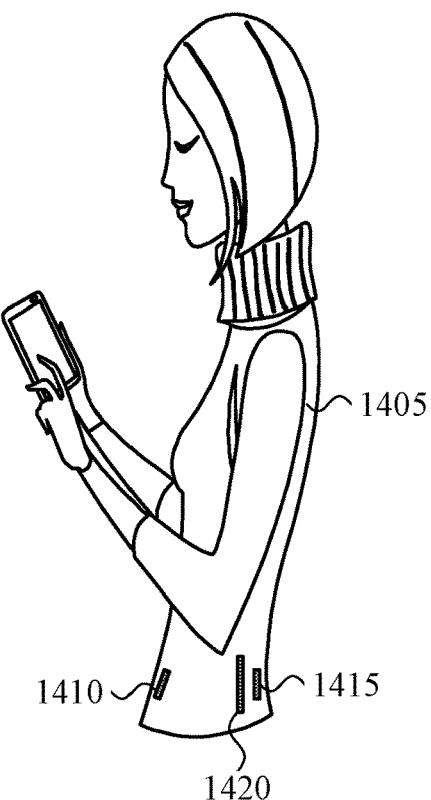
FIGS. 14A-14C demonstrates a method to measure of measuring signal strength in antennas with and without an absorption factor, according to exemplary embodiments of the present invention.
Figure 14B:
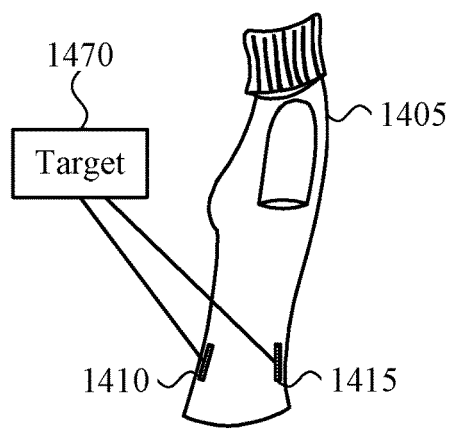
Figure 14C:
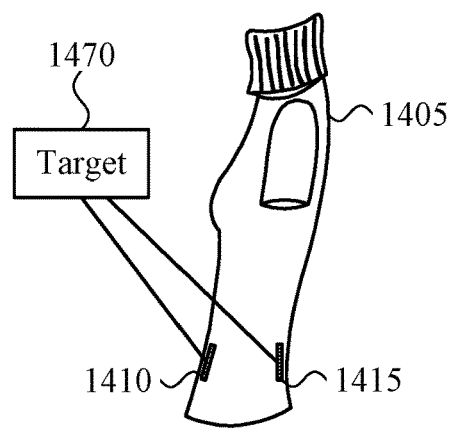

FIGS. 14A-14C demonstrates measuring signal strength between antennas with and without an additional absorption material to the absorption of the person wearing a shirt, according to exemplary embodiments of the present invention. Shirt 1405 comprises two antennas 1410 and 1415. In FIG. 14A, the shirt 1405 comprises absorbing material 1420 which may contribute to the difference in signal strength of the signal from a target as measured in each antenna of antennas 1410 and 1415. When measuring the difference in signal strength between antennas 1410 and 1415, the difference reflects the absorption factor of the person wearing the shirt and the absorption factor of the material 1420. In FIG. 14B, the shirt 1405 is worn by a person and lacks the absorbing material 1420. Both antennas 1410 and 1415 communicate with the target 1470. In FIG. 14C, shirt 1405 is worn by a person and comprises the absorbing material 1420. Both antennas 1410 and 1415 communicate with the target 1470.

The insertion or removal of the material 1420 changes the difference in signal strength measured in the antennas 1410, 1415 when communicating with the target 1470. For example, in FIG. 14B, antenna 1410 located in the direction of target 1470 may receive a signal strength of −63 dB and antenna 1415 located at the back may receive a signal strength of −75 dB due to the absorption factor of 12 dB caused by the person wearing the shirt 1425. In FIG. 14C, the signal strength of the antenna 1410 located in the direction of the target 1470 is still −63 dB while the signal strength of the antenna 1415 located in the opposite direction of the target 1470 is now −89 dB, which indicates that the additional absorbing material contributed to decreasing the signal strength by 14 dB.

Figure 15:
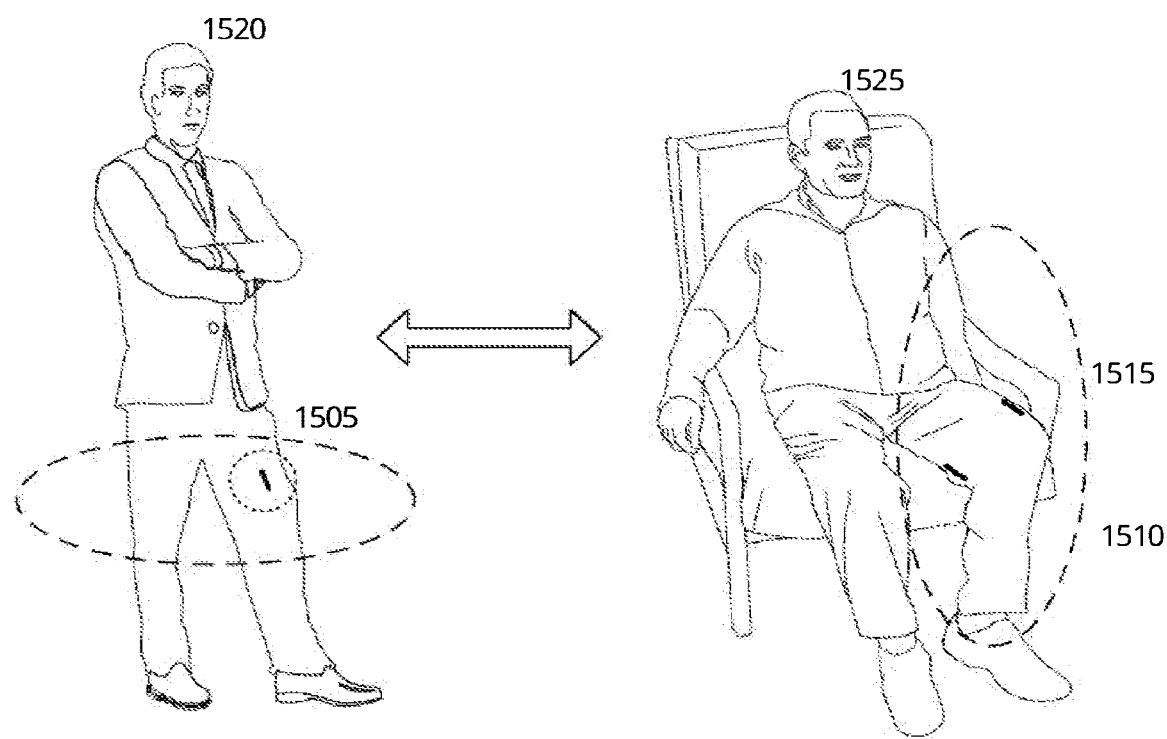
FIG. 15 shows targets transmitting RF signal with a tilt sensor indicating the physical orientation of the object carrying the antennas, according to exemplary embodiments of the present invention.

FIG. 15 shows targets transmitting RF signal with a tilt sensor indicating the physical orientation of the object carrying the antennas, according to exemplary embodiments of the present invention. A person 1520 standing with an antenna 1505 embedded in his trousers. A tilt sensor is embedded in or located near the antenna 1505 may indicate that person 1520 is standing, according to the tilt sensor's position. One tilt sensor may indicate the position of multiple antennas connected to a DF system of the subject matter. Similarly, another person 1525 is disclosed, in a sitting position, carrying two antennas, antenna 1510 and antenna 1525. Another tilt sensors detects the position of the antennas 1510 and 1525.

The data from the tilt sensors may be utilized in a method for determining whether the DF system finds a target direction on the horizontal plain (i.e., front/back/right/left, etc. . . . ) or finds a target direction on the vertical plain (up/down/same level . . . ). The method comprises receiving data from each such Tilt sensor and determining for each antenna pair containing opposite antennas if the antennas in the pair are positioned one behind the other (horizontally) or one above the other (vertically), according to a predefined configuration.

Figure 16:
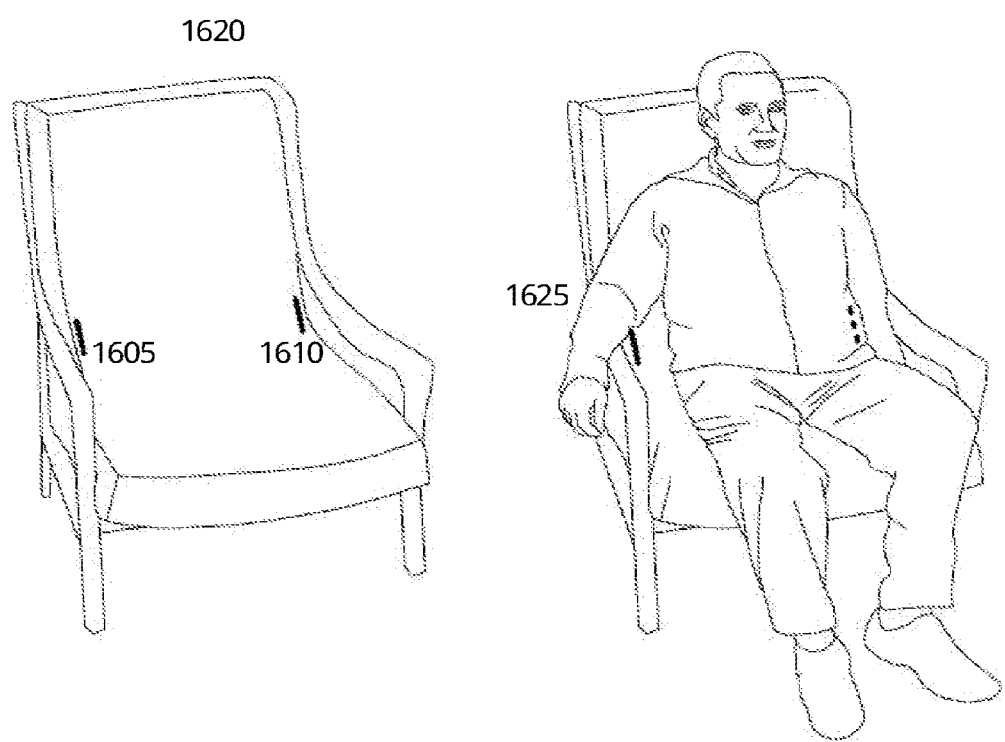
FIG. 16 shows antennas integrated into physical objects, according to exemplary embodiment of the present invention; and, FIG. 17 shows another method to find the relative direction from a DF device to a Target system, according to exemplary embodiment of the present invention.

FIG. 16 shows antennas integrated into physical objects, according to exemplary embodiment of the present invention. A pair of antennas 1625 (the other antenna is hidden by a person) is located on a chair on which a person is sitting. Another chair 1620 is equipped with antennas 1605, 1610 without the person positioned between the antennas 1605, 1610. The difference in signal strength measured between antennas 1605, 1610 is smaller than the difference between the antennas separated by the person because of the electromagnetic absorption resulting from having a person between the antennas.

Figure 17:
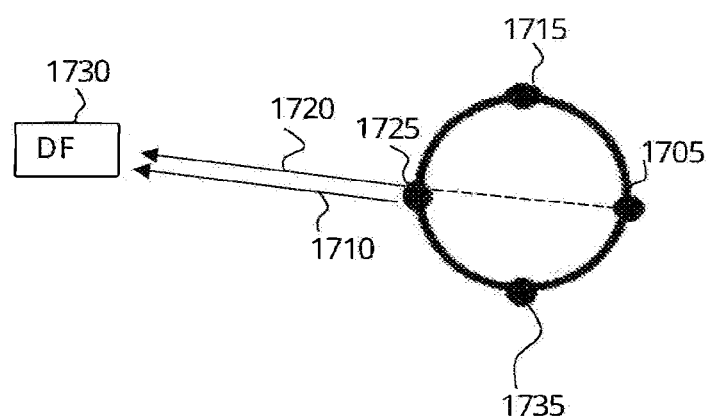

In some cases, the DF system comprises one or more sensors. The sensors are placed near each antenna of the antenna array of the DF system. For example, data collected by the sensors may be used to determine if an antenna has open space in front of it, or if not. For example, a pressure sensor may be used to determine that an antenna in the back of a shirt is applied with pressure, which may be caused due to the user sitting on a chair with his back pressed to the chair. The data collected by the sensors can be used as part of the Quality factor provided to the data measured in an antenna or even to determine that the measured data should not be used;

FIG. 17 shows a method to find the relative direction using a single radio transceiver communicating with multiple antennas having absorbing material between them, according to exemplary embodiment of the present invention. The Target system comprises antennas 1705, 1715, 1725, 1735 that transmit wireless signals directly to the DF device transceiver 1730. At least some of the antennas 1705, 1715, 1725, 1735 of the Target system are located in a manner that an absorbing material absorbs some of the signal transmitted from the antennas. The antennas 1705, 1715, 1725, and 1735 transmit signals to the DF device transceiver 1730 of the same signal strength, and the signal is received in different strengths according to the absorbing material. The DF device transceiver 1730 is aware of the heading or position of each antenna and therefore determines the relative direction of the Target according to the signal strengths of the received signals. For example, antenna 1705, and the target RF transceiver 1730, as the signal transmitted from antennas 1705 pass through path 1720 via the absorbing material, while the signal transmitted from antennas 1725 pass through path 1710 directly to the target DF transceiver 1730.

According to this method, the DF device has prior data regarding the Target system's antenna array structure and defined heading. The Target also transmits to the DF device a compass reading associated with the Target system's heading. The DF device, having data on the Target's system heading and antenna array, receive the signals transmitted from each one of the antennas in the Target's system, via a single antenna in the DF device.

Said direct wireless communication can be made by light waves and/or sound waves, and the said system and methods described above shall apply with the required changes. The system may be materialized using light wave, by using light sensors instead of antennas. The light sensor may be capable to detect light wave if frequencies that can move through the human body. The system may be materialized using sound wave, by using sound sensors instead of antennas. The sound sensor may be capable to detect light wave if frequencies that can move through the human body.

The absorbing material may be placed and/or attached to at least one antenna and/or light sensor and/or sound sensor in such manner that it will absorb the wave in a pre-defined direction. For example, the absorbing material may be placed outside a line of site between a Target and a Looker—i.e., the absorbing material is placed behind the antenna/sensor.

The DF system of the present invention may be calibrated to a user, group of users, to specific antennas, specific scenarios or measurements, and the like.

If said difference of the Target measured signal is below the customization measurement, it may indicate that the Target is not necessarily on the same "virtual line", and the system may selectively choose to ignore and/or use data from other pairs and/or determine that the Target's relative direction is to either side of the said virtual line. The basic measurement without the absorbing element may be done in advance, for example, as part of the production, quality assurance, or factory setting processes.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A method to determine a relative direction of a target light transmitter, performed by a direction finding (DF) system comprising a central unit having a processing module and at least a pair of light sensors having a light-wave-absorbing material between them, the method comprising;
   sending light signals in which the target light transmitter transmits light signals received at each one of the light sensors of the DF system;
   measuring the signal strength of the target light transmitter received at each light sensor;
   calculating the difference between the signal strength measured at each one of the light sensors in the pair;
   determining a relative direction of the target light transmitter to be the direction of the light sensor within the pair of light sensors in which the stronger light signal was measured.

2. The method of claim 1, wherein the DF system comprises a plurality of pairs of light sensors, each pair determines the relative direction of the target light transmitter.

3. The method of claim 2, wherein the relative direction of said target light transmitter is determined as a combination of the directions determined by the plurality of pairs of light sensors.

4. The method of claim 1, wherein the light-wave-absorbing material is a living matter.

5. The method of claim 1, wherein the light-wave-absorbing material is a synthetic material.

6. The method of claim 1, wherein at least two (2) different light-wave-absorbing materials are placed between the pair of light sensors.

7. The method of claim 1, further comprises measuring an absorption factor of the light-wave-absorbing material for the pair of light sensors.

8. The method of claim 7, further comprises measuring a difference in signal strengths received at each of the light sensors in the pair having the light-wave-absorbing material located between the light sensors and measuring a difference in signal strengths received at the pair of light sensors without the light-wave-absorbing material.

9. The method of claim 7, further transmitting light signals between the light sensors in the pair having the light-wave-absorbing material located between the light sensors and measuring a difference in signal strengths received at the pair of light sensors with and without the light-wave-absorbing material between the light sensors in the pair.

10. The method of claim 1, further comprises detecting information from a tilt sensor and using the information to determine an alignment of the light sensor.

11. The method of claim 1, further comprises receiving information collected from a pressure sensor located in the vicinity of the light sensor and using the pressure sensor to determine a quality factor of the measurement of the light sensor.

12. A direction finding (DF) system, comprising:
   at least one pair of light sensors designed to receive light transmissions directly receiving light signals from a target light transmitter, the pair of light sensors having a light-wave absorbing material between the light sensors;
   at least one light sensor in the pair is obstructed by said light-wave-absorbing material;
   a computerized unit configured to calculate the differences between the signal strengths measured at each one of said light sensors and to determine a relative direction of the target light transmitter to be the direction of the light sensor which received the stronger signal strength.

13. The apparatus of claim 12, wherein at least one light sensors of the at least one pair of light sensors is a non-directional light sensor.

14. The apparatus of claim 12, wherein at least one light sensor of the at least one pair of light sensors is a directional light sensor.

15. The apparatus of claim 12, wherein the light-wave-absorbing material comprises a living matter.

16. The apparatus of claim 12, wherein the light-wave-absorbing material comprises a synthetic material.

17. The apparatus of claim 12, wherein the light-wave-absorbing material comprises a synthetic material component and a living matter component.

18. The apparatus of claim 12, further comprises a power source.

19. The apparatus of claim 18, wherein the power source is an external power source.

20. The apparatus of claim 18, wherein the power source is an internal source.

21. The apparatus of claim 20, wherein the internal power source is a battery.

22. The apparatus of claim 12, further comprises a memory unit for storing an absorption factor of the light-wave-absorbing material.

23. The apparatus of claim 12, further comprises a memory unit to store the information on the signal strength received by the light sensor.

* * * * *